(12) United States Patent
Cho et al.

(10) Patent No.: US 11,285,470 B2
(45) Date of Patent: Mar. 29, 2022

(54) METHOD OF DESIGNING A LOW-PRESSURE CHAMBER

(71) Applicant: Korea Aerospace Research Institute, Daejeon (KR)

(72) Inventors: Hyok Jin Cho, Daejeon (KR); Hee Jun Seo, Daejeon (KR); Sung Wook Park, Daejeon (KR); Guee Won Moon, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 134 days.

(21) Appl. No.: 16/814,080

(22) Filed: Mar. 10, 2020

(65) Prior Publication Data
US 2020/0206728 A1 Jul. 2, 2020

Related U.S. Application Data

(62) Division of application No. 15/745,177, filed as application No. PCT/KR2016/003864 on Apr. 14, 2016, now Pat. No. 10,632,459.

(30) Foreign Application Priority Data

Jul. 22, 2015 (KR) .................... 10-2015-0103501

(51) Int. Cl.
*B01L 1/02* (2006.01)
*F04B 37/04* (2006.01)
(Continued)

(52) U.S. Cl.
CPC ............ *B01L 1/02* (2013.01); *B01J 20/0211* (2013.01); *B01J 20/0292* (2013.01); *B01J 20/04* (2013.01);
(Continued)

(58) Field of Classification Search
CPC ................. B01L 1/02; B01L 2200/146; B01L 2300/12; G01L 13/00
See application file for complete search history.

(56) References Cited

U.S. PATENT DOCUMENTS

| 6,383,050 | B1 * | 5/2002 | Ishikura | ................. C23C 14/22 445/24 |
| 2009/0001537 | A1 * | 1/2009 | Summers | ................ H01L 23/26 257/682 |

(Continued)

FOREIGN PATENT DOCUMENTS

| JP | H09210290 A | 8/1997 |
| JP | 2009241030 A | 10/2009 |

(Continued)

OTHER PUBLICATIONS

International Search Report and Written Opinion Form PCT/ISA/210, International Application No. PCT/KR2016/003864 and Written Opinion Form PCT/ISA/237, pp. 1-8, International Filing Date Apr. 14, 2016, dated Jul. 22, 2016.

*Primary Examiner* — Eric S. McCall
(74) *Attorney, Agent, or Firm* — Bond Schoeneck & King, PLLC; George McGuire (57) ABSTRACT

Provided is a method of designing a low-pressure chamber that provides a preset air pressure corresponding to a predetermined altitude. The method may include the steps of: calculating a predetermined error range of the preset air pressure, and calculating an amount and types of materials of a getter to be inserted into the low-pressure chamber based on the error range and a total volume of the low-pressure chamber.

3 Claims, 6 Drawing Sheets

(51) Int. Cl.
*B01J 20/02* (2006.01)
*B01J 20/04* (2006.01)
*B01J 20/20* (2006.01)
*G01L 13/00* (2006.01)

(52) U.S. Cl.
CPC ............... *B01J 20/20* (2013.01); *F04B 37/04* (2013.01); *G01L 13/00* (2013.01); *B01L 2200/146* (2013.01); *B01L 2200/147* (2013.01); *B01L 2300/12* (2013.01); *B01L 2300/14* (2013.01); *B01L 2300/1805* (2013.01)

(56) References Cited

U.S. PATENT DOCUMENTS

| | | | |
|---|---|---|---|
| 2015/0069539 A1* | 3/2015 | Chan | B81C 1/00285 257/417 |
| 2015/0102432 A1* | 4/2015 | Hsieh | B81B 7/0038 257/415 |
| 2018/0118558 A1* | 5/2018 | Duqi | B81B 7/0077 |
| 2021/0009471 A1* | 1/2021 | Abe | C03C 27/06 |

FOREIGN PATENT DOCUMENTS

| | | |
|---|---|---|
| KR | 100252330 | 5/2000 |
| KR | 20120040372 A | 4/2012 |
| WO | 0052728 A1 | 9/2000 |

* cited by examiner

METHOD OF DESIGNING A LOW-PRESSURE CHAMBER

CROSS-REFERENCE TO RELATED APPLICATIONS

This application is a divisional application of U.S. application Ser. No. 15/745,177, filed Jan. 16, 2018, now allowed, which is the United States National Stage entry under 35 U.S.C. 371 of PCT/KR2016/003864 filed on Apr. 14, 2016, which claims priority to Korean Application No. 1020150103501 (KR), filed Jul. 22, 2015, the entire disclosure of each of which is incorporated herein by reference.

TECHNICAL FIELD

Example embodiments relate to a low-pressure chamber that provides a preset air pressure and a method of designing the low-pressure chamber and, more particularly, to a low-pressure chamber that provides and maintains a preset air pressure using an adsorbent getter and a method of designing the low-pressure chamber.

BACKGROUND OF THE INVENTION

In general, in a simulation experiment corresponding to a predetermined altitude, a mechanical vacuum pump may be used to reduce a pressure inside a vacuum container. When the inside pressure reaches a preset altitude, the mechanical vacuum pump may be turned off to conduct the experiment. In this case, the experiment may be conducted by reducing the pressure using the mechanical vacuum pump in a pressure range corresponding to the altitude below 18 kilometers (km), for example, from atmospheric pressure to 7000 pascals (Pa) or from atmospheric pressure to 50 Torr until the pressure reaches a preset pressure, and turning off a blocking valve connecting the mechanical vacuum pump and the vacuum container to maintain the pressure.

In a simulation experiment corresponding to a higher altitude environment, a lower pressure range than the aforementioned pressure range may be applied. In this case, even when the blocking valve is turned off, a designed pressure may not be maintained due to a degassing phenomenon and a leakage phenomenon that may occur in the vacuum container. Accordingly, there is a desire for a system of maintaining a predetermined altitude environment during a predetermined period of time.

SUMMARY OF THE INVENTION

Technical Solutions

An aspect of the present invention provides a low-pressure chamber that maintains a preset air pressure corresponding to a predetermined altitude to be within a threshold range to conduct a simulation experiment and a method thereof. More particularly, the low-pressure chamber may include a getter corresponding to an experimental environment to adsorb or release an internal material based on a temperature, thereby maintaining a desired air temperature. Some aspects will be further described as an example but not limited thereto.

According to an aspect of the present invention, there is provided a low-pressure chamber that provides a preset air pressure corresponding to a predetermined altitude, the low-pressure chamber including a pressure measurer configured to measure an inside air pressure of the low-pressure chamber, a temperature controller disposed inside the low-pressure chamber to adjust, when a difference between the inside air pressure and the preset air pressure is greater than or equal to a threshold, a temperature of a thermal conductor disposed inside the low-pressure chamber, and a getter connected to the thermal conductor to absorb or release molecules inside the low-pressure chamber based on the adjusted temperature such that the difference is less than the threshold.

The temperature controller may be configured to adjust the temperature of the thermal conductor using a fluid circulating in the thermal conductor. The temperature controller may be configured to adjust the temperature of the thermal conductor through a thermal conductive element connected to the thermal conductor. The getter may include at least one of activated carbon, barium, magnesium, zirconium, and phosphorus as a constituent material.

The low-pressure chamber may further include a thermal conductive material layer configured to fill a gap between the getter and the thermal conductor to perform a heat exchange. The thermal conductive material layer may be formed by mixing hexamethylene diisocyanate, methylenediphenyl isocyanate, isophorone diisocyanate, and dibutyltin dilaurate with a synthesized polyol.

According to another aspect of the present invention, there is also provided a method of maintaining a preset air pressure of a low-pressure chamber, the method including measuring an inside air pressure of the low-pressure chamber, adjusting, when a difference between the inside air pressure and the preset air pressure is greater or equal to a threshold, an inside temperature of the thermal conductor disposed inside the low-pressure chamber, and absorbing or releasing molecules inside the low-pressure chamber using a getter based on the adjusted thermal conductor temperature of the low-pressure chamber such that the difference is less than the threshold.

The adjusting of the inside temperature of the thermal conductor may include adjusting a temperature of the thermal conductor using a fluid circulating in the thermal conductor. The adjusting of the inside temperature of the low-pressure chamber may include adjusting a temperature of the thermal conductor through a thermal conductive element connected to the thermal conductor. The getter may include a porous membrane that increases an adsorbability associated with the molecules inside the low-pressure chamber.

According to still another aspect of the present invention, there is also provided a method of designing a low-pressure chamber that provides a preset air pressure corresponding to a predetermined altitude, the method including calculating a predetermined error range of the preset air pressure and calculating an amount and types of materials of a getter to be inserted into the low-pressure chamber based on the error range and a total volume of the low-pressure chamber. The method may further include calculating an amount and types of thermal conductive materials transferring a heat to the getter based on the calculated amount and types of materials of the getter. The getter may include at least one of activated carbon, barium, magnesium, zirconium, and phosphorus as a constituent material.

BEST MODE FOR CARRYING OUT THE INVENTION

Hereinafter, example embodiments will be described in detail with reference to the accompanying drawings. It should be understood, however, that there is no intent to limit this disclosure to the particular example embodiments disclosed. Like numbers refer to like elements throughout the description of the figures. Terminologies used herein are defined to appropriately describe the example embodiments of the present disclosure and thus may be changed depending on a user, the intent of an operator, or a custom. Accordingly, the terminologies must be defined based on the following overall description of this specification.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
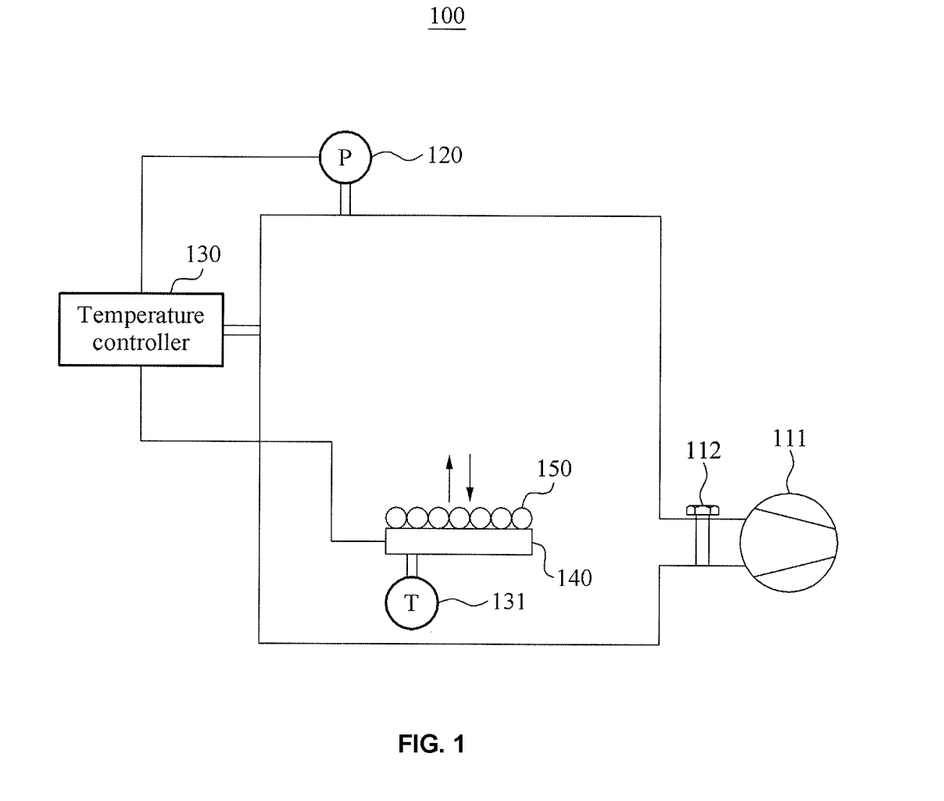
FIG. 1 is a diagram illustrating a low-pressure chamber according to an example embodiment.

FIG. 1 is a diagram illustrating a low-pressure chamber according to an example embodiment. A low-pressure chamber 100 may include a mechanical vacuum pump 111, a blocking valve 112, a pressure measurer 120, a temperature controller 130, a temperature measurer 131, a thermal conductive material layer 140, and a getter 150. The mechanical vacuum pump 111 may decrease an inside air pressure of the low-pressure chamber 100 to be equalized with a preset air pressure determined based on a simulation experiment. Specifically, the mechanical vacuum pump 111 may discharge gases present inside the low-pressure chamber 100 to an outside. When the inside air pressure of the low-pressure chamber 100 decreased by the mechanical vacuum pump 111 is within the preset air pressure and a predetermined error range, the mechanical vacuum pump 111 may be turned off. In general, the inside air pressure may be relatively low in a high-altitude vacuum environment. In such environment, even a small vibration following an operation of the mechanical vacuum pump 111 may cause an error in an experiment result value. Thus, when the inside air pressure of the low-pressure chamber 100 is within a predetermined range, the mechanical vacuum pump 111 may perform all functions, and then be turned off. Subsequently, the blocking valve 112 may be locked, so that the inside of the low-pressure chamber 100 remains blocked from the outside.

A conventional low-pressure chamber may provide a user with a near-vacuum simulation environment using the mechanical vacuum pump 111 and the blocking valve 112. As an altitude increases in an experiment environment, a preset air pressure of the low-pressure chamber may decrease. In this case, a leakage through the blocking valve 112 and an outgassing phenomenon may increase an error in the experiment.

In an example embodiment, the low-pressure chamber 100 may include the pressure measurer 120, the temperature controller 130, the temperature measurer 131, the thermal conductor 140, and the getter 150. The pressure measurer 120 may measure the inside air pressure of the low-pressure chamber 100. Similarly, the temperature measurer 131 may measure the thermal conductor 140 temperature inside the low-pressure chamber 100. The temperature controller 130 may calculate a difference between the inside air pressure measured by the pressure measurer 120 and a preset air pressure determined based on a simulation experiment. Also, when the difference between the inside air pressure and the preset air pressure is greater than or equal to a threshold, the temperature controller 130 may adjust a temperature of a thermal conductor disposed inside the low-pressure chamber 100.

The thermal conductor 140 may transfer a temperature increased or decreased by the temperature controller 130 to the getter 150. The thermal conductor 140 may include a thermal conductive material layer disposed in a gap between the thermal conductor 140 and the getter 150. The thermal conductive material layer may be disposed in the gap between the getter 150 and the thermal conductor 140 to perform a heat exchange. Specifically, the thermal conductive material layer may be formed by mixing hexamethylene diisocyanate, methylenediphenyl isocyanate, isophorone diisocyanate, and dibutyltin dilaurate with a synthesized polyol.

The getter 150 may adsorb or release molecules inside the low-pressure chamber 100 based on the temperature adjusted in connection with the thermal conductor 140 such that the difference is maintained to be less than the threshold. The getter 150 may be implemented using various forms of materials that chemically adsorb residual gases or evolved gases in a physically or chemically evacuated sealed vacuum system to maintain a vacuum state. Specifically, the getter 150 may include at least one of activated carbon, barium, magnesium, zirconium, and phosphorus as a constituent material.

Figure 2A:
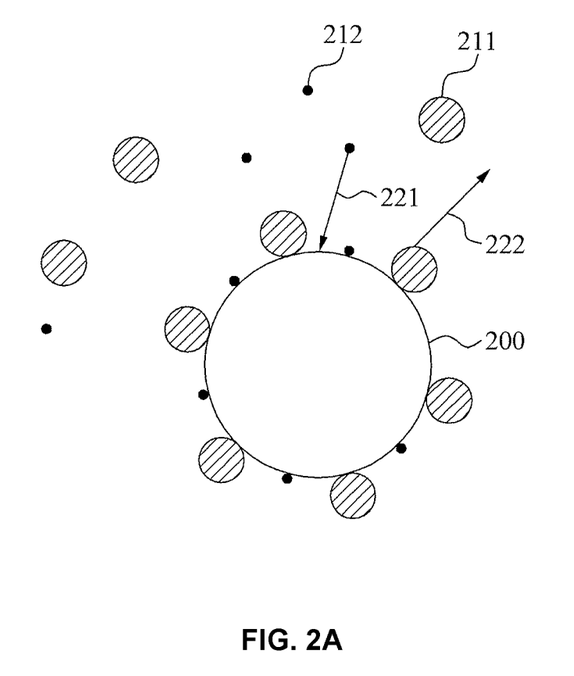
FIGS. 2A and 2B are diagrams illustrating examples of a function of a getter based on an adjustment of a temperature.
Figure 2B:
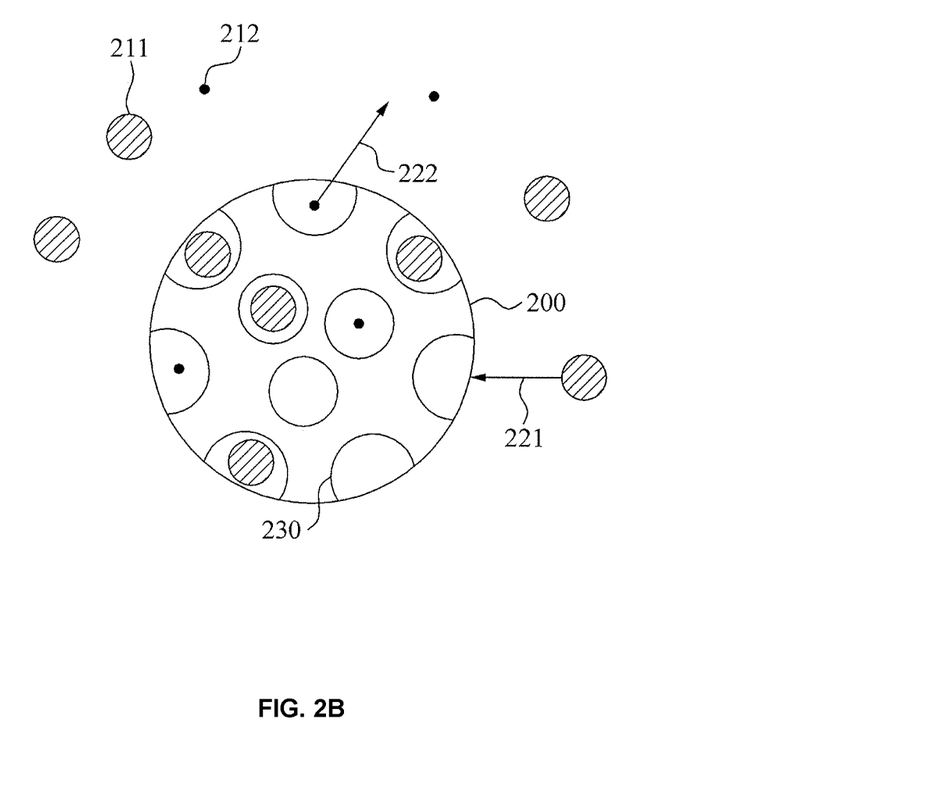

FIGS. 2A and 2B are diagrams illustrating examples of a function of a getter based on an adjustment of a temperature. FIG. 2A illustrates a getter 200. The getter 200 may perform adsorption 221 or release 222 of molecules 211 and 212 inside a low-pressure chamber. Specifically, when a temperature of the getter 200 is decreased, the getter 200 may perform the adsorption 221 of the molecules 211 and 212. Also, when a temperature of the getter 200 is increased, the getter 200 may perform the release 222 of the molecules 211 and 212.

The getter 200 may be implemented using various materials having an absorption function. A material of the getter 200 may be determined based on whether the material is physically and chemically stable, whether the material has processability and formability, whether the material is thermally stable, whether the material is adsorbable with gases and impurities, and whether the material has maintainability with respect to the adsorbed gases or impurities.

Specifically, the getter 200 may be implemented using, for example, a molecular sieve, zeolites, silica gel, a carbonate, a clay, a metallic oxide, metal hydroxides, alkaline earth metal oxides, a sulfate, alkali metal halides, a perchlorate, and an organic metal. In an example, any one of sodium carbonate and sodium bicarbonate may be used as the carbonate. In addition, any one of lithium oxide ($Li_2O$), sodium oxide ($Na_2O$), and potassium oxide ($K_2O$) may be used as the metallic oxide. Also, any one of lithium sulfate ($Li_2SO_4$), sodium sulfate ($Na_2SO_4$), calcium sulfate ($CaSO_4$), magnesium sulfate ($MgSO_4$), cobalt(II) sulfate ($CoSO_4$), gallium(III) sulfate ($Ga_2(SO_4)_3$), titanium(IV) sulfate ($Ti(SO4)_2$), and nickel(II) sulfate ($NiSO_4$) may be used as the sulfate. In another example, the getter 200 may include at least one of activated carbon, barium, magnesium, zirconium, and phosphorus as a constituent material.

Referring to FIG. 2B, the getter 200 may include a porous membrane 230. The getter 200 including the porous membrane 230 may have increased adsorbabilities associated with the molecules 211 and 212 inside the adsorbed low-pressure chamber.

Figure 3:
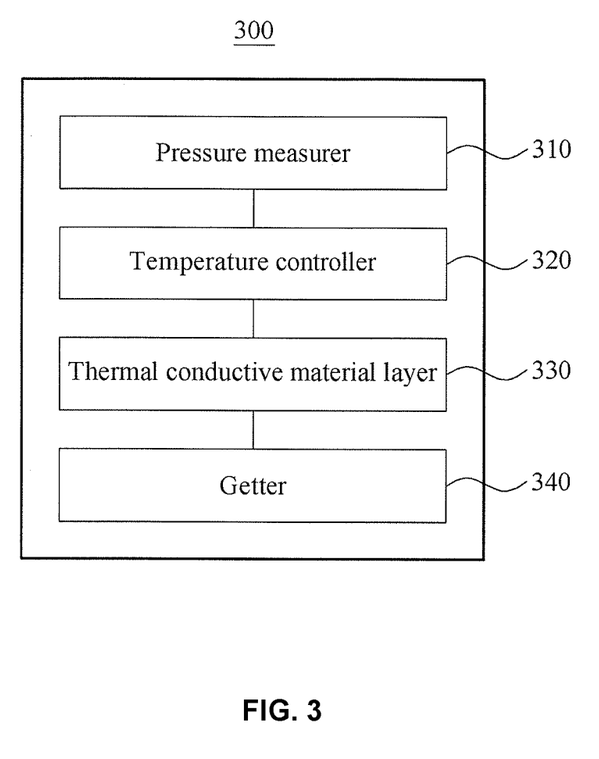
FIG. 3 is a block diagram illustrating a low-pressure chamber according to an example embodiment.

FIG. 3 is a block diagram illustrating a low-pressure chamber according to an example embodiment. A low-pressure chamber 300 may include a pressure measurer 310, a temperature controller 320, a thermal conductive material layer 330, and a getter 340. The pressure measurer 310 may measure an inside air pressure of the low-pressure chamber 300. Specifically, the pressure measurer 310 may measure the inside air pressure of the low-pressure chamber 300 in a form of an absolute pressure, a gauge pressure, or a different pressure.

The pressure measurer 310 may be implemented using a semiconductor diffusion element. For example, the pressure measurer 310 may be implemented based on a piezoresistive effect. The piezoresistive effect may indicate a phenomenon that an energy structure in a semiconductor crystal changes in response to a change in external pressure, the number of carriers is changed correspondingly, and a unique resistance value of a semiconductor is also changed in response thereto. The pressure measurer 310 may be implemented using a circuit including a diode of which a flow of current changes in a forward or reverse direction in response to a change in pressure. Also, the pressure measurer 310 may be implemented as one of a strain semiconductor pressure gauge or a capacitive semiconductor pressure gauge. The foregoing is merely an example of the pressure measurer 310 and should not be construed as limiting the scope of the present invention.

The temperature controller 320 may determine a difference between an inside air pressure of the low-pressure chamber 300 and a preset air pressure determined based on a simulation experiment. The temperature controller 320 may include a temperature measurer to measure the thermal conductor temperature. In an example, the temperature controller 320 may be disposed inside the low-pressure chamber 300 to measure the thermal conductor temperature.

In another example, the temperature measurer of the temperature controller 320 may be disposed inside the low-pressure chamber 300 and a main body of the temperature controller 320 may be disposed outside the low-pressure chamber 300. The thermal conductor temperature measured by the temperature measurer may be transmitted to the main body of the temperature controller 320. Specifically, the transmitting may be performed through a communication interface. The communication interface may include, for example, a wireless Internet interface such as Wireless LAN (WLAN), Wireless Fidelity (WiFi) Direct, Digital Living Network Alliance (DLNA), Wireless broadband (Wibro), World Interoperability for Microwave Access (Wimax), High Speed Downlink Packet Access (HSDPA), and the like, and a near field communication interface such as Bluetooth™, Radio Frequency Identification (RFID), Infrared Data Association (IrDA), Ultra Wideband (UWB), ZigBee, Near Field Communication (NFC) and the like. Also, the communication interface may represent any interface, for example, a wired interface capable of communicating with an external source.

When the difference between the inside air pressure and the preset air pressure is greater than or equal to a threshold, the temperature controller 320 may adjust a temperature of a thermal conductor disposed inside the low-pressure chamber 300. The temperature controller 320 may adjust the temperature of the thermal conductor using a fluid circulating in the thermal conductor. Also, the temperature controller 320 may adjust the temperature of the thermal conductor using a thermal conductive element connected to the thermal conductor.

The thermal conductive material layer 330 may perform a heat exchange while filling a gap between the getter 340 and the thermal conductor. For example, the thermal conductive material layer 330 may be formed by mixing hexamethylene diisocyanate, methylenediphenyl isocyanate, isophorone diisocyanate, and dibutyltin dilaurate with a synthesized polyol. The aforementioned configuration is merely an example and thus, various compounds may also be used in consideration of a preset air pressure of a simulation experiment or a material of the getter 340.

The getter 340 may be connected to the thermal conductor. Specifically, the thermal conductive material layer 330 may connect the thermal conductor and the getter 340. For example, when the inside air pressure of the low-pressure chamber 300 is decreased, the getter 340 may release molecules inside the low-pressure chamber 300 to increase the inside air pressure. Also, when the inside air pressure of the low-pressure chamber 300 is increased, the getter 340 may adsorb the molecules inside the low-pressure chamber 300 to decrease the inside air pressure. Through this, the inside air pressure of the low-pressure chamber 300 may be maintained in a range below the threshold and the preset air pressure. Related description will be further provided with reference to the following flowchart.

Figure 4:
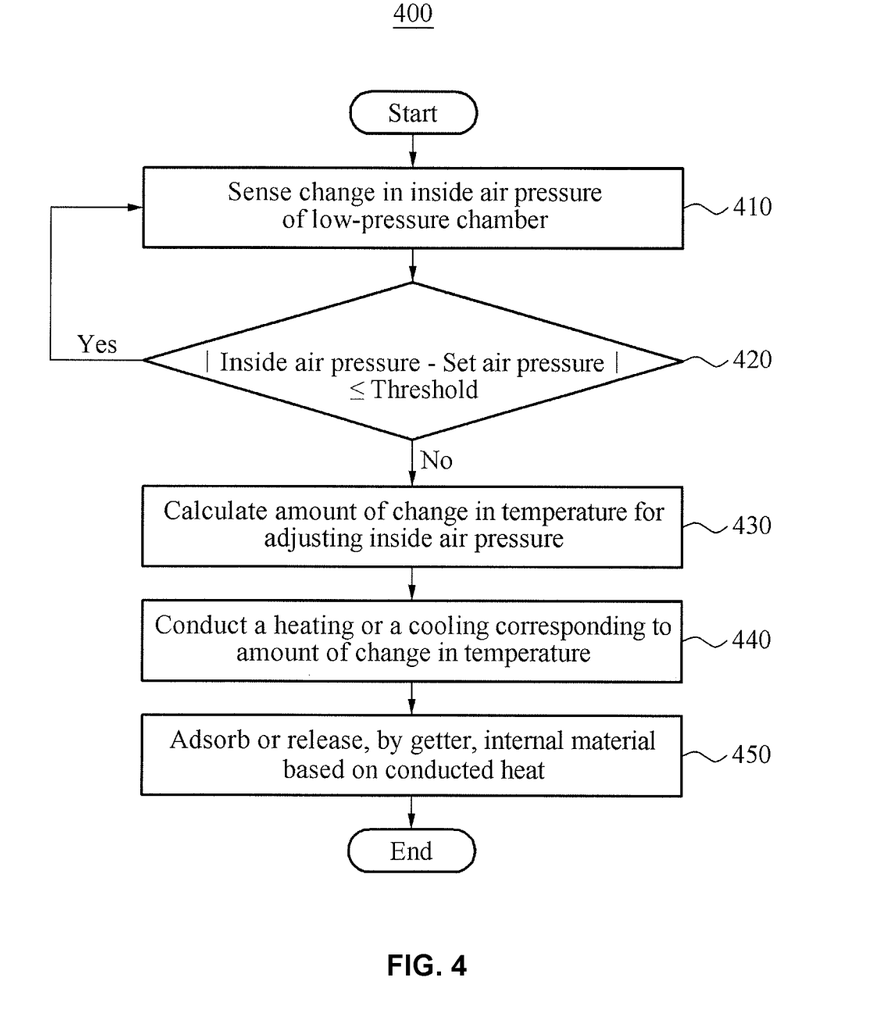
FIG. 4 is a flowchart illustrating a method of adjusting an inside air pressure of a low-pressure chamber according to an example embodiment.

FIG. 4 is a flowchart illustrating a method of adjusting an inside air pressure of a low-pressure chamber according to an example embodiment. A method 400 of maintaining a preset air pressure of a low-pressure chamber may measure an inside air pressure of the low-pressure chamber in operation 410, compare a difference between the inside air pressure and the preset air pressure to a threshold in operation 420, calculate an amount of change in temperature for adjusting the inside air pressure in operation 430, conduct a heating or a cooling corresponding to the amount of change in temperature in operation 440, and absorb or release an internal material using a getter in response to the heat being conducted in operation 450.

Operation 410 may be an operation of sensing a change in inside air pressure of a low-pressure chamber. As described in FIG. 1, the inside air pressure of the low-chamber pressure may be set within a threshold range based on a preset air pressure using a mechanical vacuum pump and a blocking valve. Even when the inside air pressure is set within the threshold range, the inside air pressure may exceeds the threshold range based on the preset air pressure due to, for example, a leakage from a low-pressure chamber outside, which may lead to an occurrence of an error in a simulation experiment. Thus, in operation 410, the change in inside air pressure of the low-pressure chamber may be sensed to detect a possibility of the error. For example, the pressure measurer 310 of FIG. 3 may be used in operation 410.

Operation 420 may be an operation of determining whether a difference between the inside air pressure and the preset air pressure is less than or equal to a threshold. When the difference between the inside air pressure and the preset air pressure is greater than the threshold, the following operations 430, 440, and 450 may be performed to adjust the inside air pressure. When the difference between the inside air pressure and the preset air pressure is maintained to be less than or equal to the threshold, operation 410 may be performed to sense the change in inside air pressure of the low-chamber by returning to operation 410.

Operation 430 may be an operation of calculating an amount of change in temperature for adjusting the inside air pressure. For example, when the inside air pressure decreases, a heat transferred to a getter may increase such that the getter releases an internal material of the low-pressure chamber. Also, when the inside air pressure increases, a cooling of the getter may occur such that the getter adsorbs the internal material of the low-pressure chamber.

Operation 440 may be an operation of conducting a heating or a cooling corresponding to the calculated amount of change in temperature. In operation 440, various materials that are used for thermal conduction may be applied. In operation 450, the getter may adsorb or release the internal material based on the conducted heating or the cooling and the inside air pressure may be adjusted to be within a threshold range based on an initially set air pressure.

Figure 5:
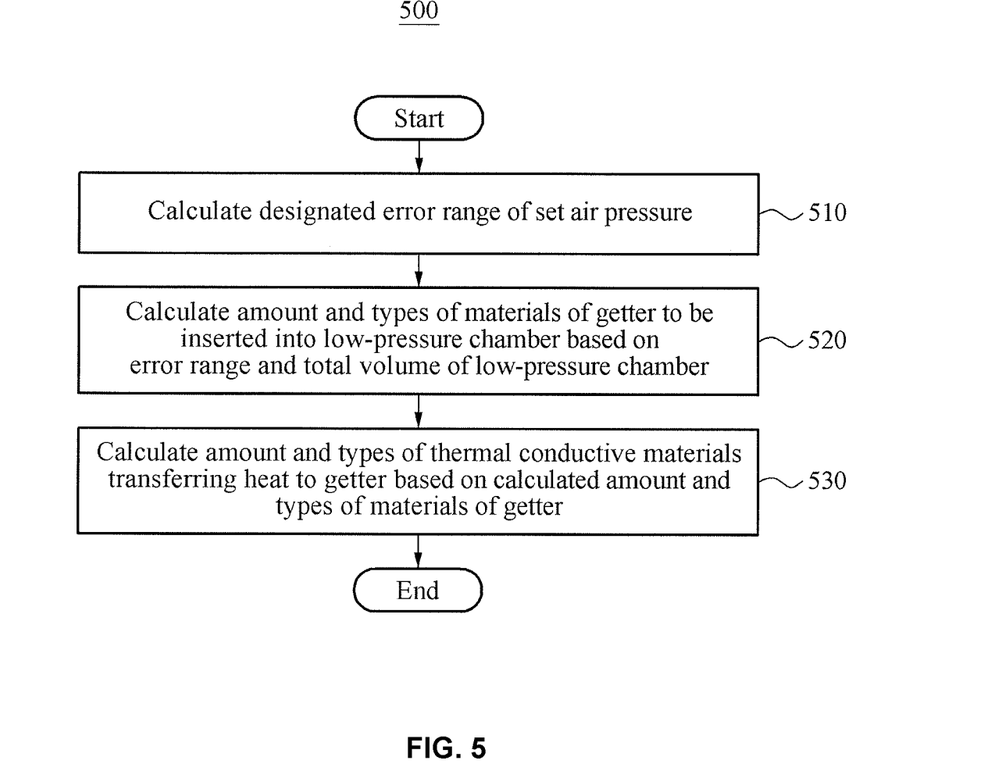
FIG. 5 is a flowchart illustrating a method of designing a low-pressure chamber according to an example embodiment.

FIG. 5 is a flowchart illustrating a method of designing a low-pressure chamber according to an example embodiment. A method 500 of designing a low-pressure chamber that provides a preset air pressure corresponding to a predetermined altitude may calculate a predetermined error range of the preset air pressure in operation 510, calculate an amount and types of materials of a getter to be inserted into the low-pressure chamber based on the error range and a total volume of the low-pressure chamber in operation 520, and calculate an amount and types of thermal conductive materials for the heating or the cooling the getter based on the calculated amount and types of materials of the getter in operation 530.

Operation 510 may be an operation of calculating a designated error range of a preset air pressure. Depending on a purpose of a simulation experiment, an error range of the simulation experiment may be large or small. In operation 510, the error range corresponding to the simulation experiment may be calculated. In this example, a degree of a pressure change to which a getter adsorbs or releases an internal material may be set in advance.

Operation 520 may be an operation of calculating an amount and types of materials of the getter to be inserted into a low-pressure chamber based on the error range and a total volume of the low-pressure chamber. As described in FIG. 1, the getter may be implemented using various materials having an adsorption function. Thus, the amount and types of materials of the getter may be calculated based on accuracy and costs required for the simulation experiment. Based on a constituent material of the getter, a pressure may be changed radically in response to a slight change in temperature or the pressure may also be changed slightly in response to a radical change in temperature. For example, the getter may include at least one of activated carbon, barium, magnesium, zirconium, and phosphorus, which are widely used at present, as a constituent material.

Operation 530 may be an operation of calculating an amount and types of thermal conductive materials for the heating or the cooling the getter based on the calculated amount and types of materials of the getter. Similarly to the aforementioned getter, a variety of materials or compounds may be used as the thermal conductive material. Thus, in the corresponding operation, the amount and types of materials of the getter may be calculated based on accuracy and costs required for the simulation experiment. For example, the thermal conductive material may be implemented by mixing hexamethylene diisocyanate, methylenediphenyl isocyanate, isophorone diisocyanate, and dibutyltin dilaurate with a synthesized polyol.

The above-described method may be applied to apparatuses. The above-described method may be executed by a pre-distributed computer program or application. Accordingly, when an input value corresponding to a specification of an experiment to the computer program or the application, a user performing the experiment may obtain a configuration of a low-pressure chamber corresponding to a predetermined altitude, an amount and types of materials of a getter, and an amount and types of thermal conductive materials as an output.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of designing a low-pressure chamber that maintains a preset air pressure corresponding to a predetermined altitude, the method comprising:
   calculating a predetermined error range of the preset air pressure; and
   calculating an amount and types of materials of a getter to be inserted into the low-pressure chamber based on the error range and a total volume of the low-pressure chamber.

2. The method of claim 1, further comprising:
   calculating an amount and types of thermal conductive materials transferring a heat to the getter based on the calculated amount and types of materials of the getter.

3. The method of claim 1, wherein the getter comprises at least one of activated carbon, barium, magnesium, zirconium, and phosphorus as a constituent material.

* * * * *